United States Patent [19]

Kimura et al.

[11] Patent Number: 5,283,265
[45] Date of Patent: Feb. 1, 1994

[54] PHOTOPOLYMERIZABLE RUBBER

[75] Inventors: Tetsuya Kimura; Syuno Suto; Fujii Toshihiro; Toshihiro Fujii; Kimio Mori, all of Fukuyama; Tsuguo Yamaoka, Funabashi, all of Japan

[73] Assignee: Hayakawa Rubber Company Limited, Japan

[21] Appl. No.: 182,500

[22] Filed: Apr. 18, 1988

Related U.S. Application Data

[63] Continuation-in-part of Ser. No. 906,608, Sep. 10, 1986, abandoned, which is a continuation of Ser. No. 651,270, Sep. 17, 1984, abandoned.

[30] Foreign Application Priority Data

Dec. 8, 1983 [JP] Japan .................. 58-230515

[51] Int. Cl.$^5$ .................. C08F 2/50; C08F 26/02; C08F 226/02; C08F 271/00
[52] U.S. Cl. .................. 522/18; 522/21; 522/22; 522/39; 522/40; 522/43; 522/44; 522/46; 522/48; 522/53; 522/59; 522/60; 522/62; 522/63; 522/96; 522/98; 528/65; 528/75; 525/457
[58] Field of Search .................. 522/90, 96, 18, 21, 522/22, 39, 40, 43, 48, 46, 44, 53, 59, 60, 62, 63, 98; 528/65, 75; 525/457

[56] References Cited

U.S. PATENT DOCUMENTS

| 2,929,800 | 5/1960 | Hill | 525/457 |
|---|---|---|---|
| 2,948,707 | 8/1960 | Benning | 525/475 |
| 3,678,014 | 7/1972 | Suzuki | 525/387 |
| 3,855,379 | 12/1974 | Araki | 522/98 |
| 4,020,125 | 4/1977 | Suzuki | 525/455 |
| 4,192,684 | 3/1980 | Gensho | 430/281 |
| 4,295,909 | 10/1981 | Baccei | 522/96 |
| 4,309,526 | 1/1982 | Baccei | 522/97 |
| 4,447,563 | 5/1984 | Kanaoka | 524/718 |

FOREIGN PATENT DOCUMENTS

| 48-10394 | 4/1973 | Japan . |
|---|---|---|
| 51-103136 | 9/1976 | Japan . |
| 53-84036 | 7/1978 | Japan . |
| 1531351 | 11/1978 | Japan . |
| 55-94905 | 7/1980 | Japan . |
| 86903 | 7/1981 | Japan . |
| 58-76414 | 5/1983 | Japan . |
| 123525 | 7/1985 | Japan . |
| 2178436 | 2/1987 | United Kingdom . |

OTHER PUBLICATIONS

Allport "Block Copolymers", Applied Science Publishers Ltd. 1973. pp. 456–465.

Primary Examiner—Marion E. McCamish
Assistant Examiner—Arthur H. Koeckert
Attorney, Agent, or Firm—Parkhurst, Wendel & Rossi

[57] ABSTRACT

A photopolymerizable rubber being obtained by copolymerizing four compounds consisting of a dienic liquid rubber having hydroxyl groups, an ethylenically unsaturated monomer having hydroxyl groups, a dihydric alcohol having a molecular weight of less than 2,000 and a diisocyanate compound. The photocured product of this composition has higher tensile strength and elongation than that of the prior photopolymerizable rubbers.

7 Claims, No Drawings

PHOTOPOLYMERIZABLE RUBBER

This is a continuation-in-part of U.S. Ser. No. 906,608, filed Sep. 10, 1986, abandoned, which in turn is a continuation of U.S. Ser. No. 651,270, filed Sep. 17, 1984, abandoned.

BACKGROUND OF THE INVENTION

1. Field of the Invention

This invention relates to a photopolymerizable rubber.

2. Description of the Prior Art

A photopolymerizable rubber prepared by blending a dienic liquid rubber having hydroxyl groups, an ethylenically unsaturated monomer having hydroxyl groups and an isocyanate compound has already been known. It has further been well-known to blend into the rubber a photosensitizer and the like for increasing a photocurability or a thermopolymerization inhibitor and the like for inhibiting gelation in storage (Japanese Patent Laid-open Application No. 56-86,903).

However, photocured products of the photopolymerizable rubber are low in tensile strength and brittle. They are also low in elongation. Therefore, they are inconvenient for applications requiring a flexible cured product.

SUMMARY OF THE INVENTION

In order to solve these problems, the inventors have found that it is possible to obtain photocured products having a tensile strength of more than 4-10 times higher than that of a photocured product of the above described composition by using a dihydric alcohol having a molecular weight of less than 2,000, preferably less than 300, together with the above described rubber. Furthermore, such photocured products surprisingly have shown an elongation of more than 2-20 times higher than the above-described rubber.

The present invention lies in a photopolymerizable rubber prepared by uniformly blending a dienic liquid rubber having hydroxyl groups, an ethylenically unsaturated monomer having hydroxyl groups, a dihydric alcohol having a molecular weight of less than 2,000, preferably less than 300, and a diisocyanate compound, said rubber having a structure comprising hard segments having a urethane bond consisting of the dihydric alcohol having a molecular weight of less than 2,000, preferably less than 300, and the diisocyanate compound, photo-crosslinked points owing to an ethylenically unsaturated monomer having hydroxyl groups bonded to the hard segments, and soft segments composed of a rubber molecular chain.

Another object of the present invention is to provide a photopolymerizable rubber, wherein the blending ratio of said main component of said rubber is $1{:}m{:}(mn){:}m(n+1)$ between dienic liquid rubber, ethylenically unsaturated monomer, dihydric alcohol and diisocyanate compound (m represents the hydroxyl group valence in a molecule and is $1<m<4$, n is a repeating unit number of a urethane bond consisting of diisocyanate compound and dihydric alcohol having a molecular weight of less than 2000).

A further object of the present invention is to provide a photopolymerizable rubber, wherein the photopolymerizable rubber consists essentially of 100 parts by weight of dienic liquid rubber, 2-25 parts by weight of ethylenically unsaturated monomer, 1-90 parts by weight of dihydric alcohol, and 5-190 parts by weight of diisocyanate compound.

DESCRIPTION OF THE PREFERRED EMBODIMENTS

Dienic liquid rubbers having hydroxyl groups used in this invention include polymers having a number-average molecular weight of about 1,000-10,000 such as 1,2-polybutadiene, 1,4-polybutadiene, 1,2-pentadiene, styrene-butadiene copolymer, acrylonitrile-butadiene copolymer having hydroxyl groups in the molecules and the position of the hydroxyl groups being arbitrary. Moreover, the hydroxyl value (m) in a molecule is about $1<m<4$. In the case of $m\leq 1$, a photopolymerization density of the composition of this invention is low and the photocured product is brittle. Further, in the case of $m\geq 4$, the product is hard and the elasticity is low and such cases are not preferable.

In this invention, one or more of dienic liquid rubbers having hydroxyl groups may be used.

Ethylenically unsaturated monomers having hydroxyl groups include, for example, 2-hydroxyethyl acrylate, 2-hydroxyethyl methacrylate, 2-hydroxylpropyl acrylate, 2-hydroxypropyl methacrylate, polypropylene glycol monomethacrylate, etc., and in this invention, one or more of these ethylenically unsaturated monomers having hydroxyl groups present in amounts of 2 to 25 parts per 100 parts of dienic liquid rubber may be used.

Diisocyanate compounds include tolylene diisocyanate, xylylene diisocyanate, naphthalene diisocyanate, hexamethylene diisocyanate, isophorone diisocyanate, 4,4'-diphenylmethane diisocyanate, lysine diisocyanate, hydrogenated tolylene diisocyanate, etc., and in this invention, one or more of these diisocyanate compounds present in amounts of 5-190 parts per 100 parts of dienic liquid rubber may be used.

Further, the dihydric alcohols having a molecular weight of less than 2,000 include ethylene glycol, diethylene glycol, triethylene glycol, 1,2-propylene glycol, 1,3-propylene glycol, 1,3-butanediol, 1,4-butanediol, 1,5-pentanediol, 1,6-hexanediol. Further examples of dihydric alcohols having a molecular weight of less than 2,000 include those dihydric alcohols having ethylenically unsaturated groups. Dihydric alcohols having ethylenically unsaturated groups include trimethylol propane monoacrylate, trimethylolpropane, monomethacrylate, etc. and one or more of these dihydric alcohols present in amounts of 1-90 parts per 100 parts of dienic liquid rubber may be used.

When a repeating unit n(n is explained hereinafter) is 1, the components are employed in the amount of 2 moles of the dihydric alcohol having a molecular weight of less than 2,000, 4 moles of diisocyanate compound and 2 moles of ethylenically unsaturated monomer having hydroxyl groups all based on 1 mole of dienic liquid rubber having two hydroxyl groups in a molecule. Further, if n is 2-16, the ratio is $m\times n$ moles of the dihydric alcohol having a molecular weight of less than 2,000, $m(n+1)$ moles of diisocyanate compound, and m moles of ethylenically unsaturated monomer having hydroxyl groups based on 1 mole of diene type liquid rubber having hydroxyl groups of valence (m) in a molecule.

The photopolymerizable rubber is obtained by: 1) reacting mn mole of dihydric alcohol (A) with $m(n+1)$ mole of diisocyanate compound (B); 2) reacting thus obtained prepolymer (C) with m mole of ethylenically unsaturated monomer (D) having monohydroxy groups; and 3) reacting thus obtained prepolymer (E) with 1 mole of dienic liquid rubber having hydroxy groups.

The blending order is not particularly limited, but for purposes of illustration only, one example of blending is given. In this case, 16 moles of the dihydric alcohol having a molecular weight of less than 2,000, preferably less than 300, and 18 moles of diisocyanate are blended and, if necessary, a urethane catalyst such as dibutyltin laurate, stannous octate, triethyl amine, triethylene diamine, etc., is added thereto. The reaction temperature should be from 0° to 120° C., preferably from 40° to 80° C. By such a reaction, a terminal isocyanate compound is obtained. Then, 2 moles of the ethylenically unsaturated monomer having hydroxyl groups and 1 mole of dienic liquid rubber having divalent hydroxyl groups are added thereto. If necessary, the reaction is carried out by adding a thermal polymerization inhibitor of 0.01–0.1 weight % of the total blended weight, such as hydroquinone, t-butyl catechol, o-dinitrobenzene, o-nitrophenol, m-nitrophenol, p-nitrophenol, 2,4-dinitrophenol, 2,4,6-trinitrophenol, ferric chloride, etc. The temperature should be from 0° to 90° C., preferably from 40° to 80° C., whereby photopolymerizable rubber of acryloyl compound, methacryloyl compound or mixtures thereof are obtained.

The main component of the rubber of this invention can be represented by the following formula

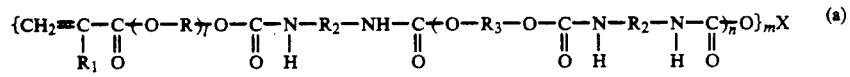

wherein R is an alkylene having 2–8 carbon atoms, $R_1$ is hydrogen or $CH_3$, $R_2$ is diisocyanate residue, $R_3$ is a residue excluding hydroxyl groups of dihydric alcohol of a molecular weight of less than 2,000, preferably less than 300, and having a structural formula:

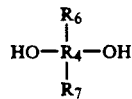

wherein $R_4$ is an alkylene group having 2–8 carbon atoms, $R_6$ and $R_7$ are hydrogen or alkyl groups respectively, X is a residue of the hydroxyl containing dienic liquid rubber where a hydroxyl group is removed, l is about 1–4, m is the valence rubber of hydroxyl groups of the hydroxyl containing dienic liquid rubber and is $1 < m < 4$, and n is from 1 to 16, more preferably, 2 to 16.

In the above formula, n is a repeating unit number of a urethane bond consisting of a diisocyanate compound and dihydric alcohol having a molecular weight of less than 2,000, preferably less than 300, and corresponds to a length of a part forming a hard segment to a rubber molecular chain (a soft segment). A long hard seoment is formed by a continuity of urethane bond having high polarity and cohesiveness and causes a microscopic phase separation from the rubber molecular chain having low polarity and cohesiveness. And the long hard segment provides a close crosslinkage to photopolymerizable ethylenically unsaturated monomers linked to the hard segment. As a result, photocured products having a high strength and a high elongation can be obtained. When a dihydric alcohol having a molecular weight of more than 2,000 is used, it is difficult to cause the phase separation between the hard segment and the soft segment and such a case is not desirable. Furthermore, when the repeating unit number n is more than 16, the rubber-like property is lost and such a case is not desirable.

Further, a photosensitizer and an addition polymerizable monomer may be added alone or in combination to the photopolymerizable rubber, if necessary. In this case, a proper blending amount is 1–10 parts by weight of photosensitizers and 10–300 parts by weight of an addition polymerizable monomer, both present in amounts with respect to 100 parts by weight of the rubber. Additionally, 0.05–1 parts by weight of thermal polymerization inhibitor, based on 100 parts by weight of dienic liquid rubber, may also be added.

Photosensitizers include benzoin, benzoin methyl ether, benzoin isopropyl ether, benzoin butyl ether, benzophenone, Michler's ketone, 1-naphthalene sulfonylchloride, 2,5-napthalene disulfonylchloride, 2-naphthalene sulfonylchloride, azoisobutylonitrile, 1-azobis-1-cyclohexanecarbonitrile, benzil dimethyl ketal, 2-methylanthraquinone, biimidazole, thioxanthone, 2,4-diisopropylthioxanthone, 2,2-diethoxyacetophenone, benzoin peroxide, 2,4-dichlorobenzoyl peroxide, etc.

If it is required to adjust the viscosity and photocurability, the photocurable product obtained by the aforementioned reaction may be added with an ethylenically unsaturated monomer such as the above-described ethylenically unsaturated monomers having a hydroxyl qroup, methacrylates such as methyl methacrylate, ethyl methacrylate, butyl methacrylate, glycidyl methacrylate, 1,4-butylene dimethacrylate, ethyleneglycol dimethacrylate, diethylaminoethyl methacrylate, etc., acrylates such as methyl acrylate, ethyl acrylate, butyl acrylate, lauryl acrylate, trimethylolpropane diacrylate, trimethylolpropane triacrylate, neopentyl glycol diacrylate, 1,6-hexanediol diacrylate, diethylaminoethyl acrylate, etc., methacrylic acid, acrylic acid, acrylonitrile, acrylamide, N-methylol acrylamide, styrene, vinyl toluene, divinyl benzene, α-methyl styrene, vinyl acetate, N-vinyl-2-pyrrolidone, diallyl phthalate, etc.

The material of this invention is rubber-like photopolymerizable rubber characterized in that photocured products show a high strength and a high elongation.

According to this invention, solvent insoluble photocured products having superior tensile strength and elongation and high flexibility can be obtained and the photopolymerizable rubber can be used as high elastic ink, high elastic paint, a flexoplate, etc.

The following examples are intended to illustrate this invention without limiting the scope thereof.

COMPARATIVE EXAMPLE 1

A solution of 28.4 g of 2,4-tolylene diisocyanate (abbreviated as "TDI" hereinafter) in 85.2 g (three times as much as "TDI" weight) of dioxane was introduced into a reactor of 500 ml by volume and a solution of 21.2 g of 2-hydroxyethyl methacrylate (abbreviated as "HEMA" hereinafter) in 63.6 g (three times as much as "HEMA" weight) of dioxane was added dropwise thereto through a dropping funnel while stirring under an atmosphere of nitrogen. During the dropwise addition, the reaction solution was maintained at 45°-50° C. After completion of the dropwise addition, the solution was allowed to react at 45°-50° C. for 2 hours. Then, a solution of 100 g of Poly bd LM-10 (polybutadiene rubber having terminal hydroxyl groups, an average molecular weight of 1,120, hydroxyl groups content 1.63 meg/g, made by Idemitsu Sekiyu Kagaku Inc.), 0.15 g of hydroquinone and 0.075 g of triethylenediamine in 300 g (three times as much as the liquid rubber weight) of dioxane was introduced into a separate reactor of 1,000 ml by volume and the above described reaction product was added dropwise to said separate reactor through a dropping funnel while stirring under an atmosphere of nitrogen. During the dropwise addition of the reaction material, the reaction solution was maintained at 75°-80° C. After completion of the dropwise addition, the solution was allowed to react at 75°-80° C. for 8 hours. The disappearance of a peak of isocyanate groups was confirmed by the infrared spectrophotomer and the reaction was terminated.

The reaction solution was gradually introduced into a beaker containing 5,400 ml (nine times as much as the reaction solution) of hexane while stirring the beaker to obtain a white precipitate. The precipitate, purified by the use of hexane, was allowed to dry for 2 days by a vacuum dryer. After the drying, liquid urethane acrylate was obtained. Irgacure 651 (a product of Nippon Ciba-Geigy Inc.) of 5% as a sensitizer was added to the urethane acrylate to prepare a photosensitive liquid. This photosensitive liquid was added dropwise on a glass plate and spread into 100 μm in thickness with an applicator and exposed to an ultra-high voltage mercury lamp of 3 KW placed at a distance of 50 cm from the plate for 5 minutes to obtain a cured film. The tensile strength and the elongation of the cured film were determined by a tension tester (the tension rate of 100 mm/min) to obtain the result of a tensile strength of 6 kg/cm² and an elongation of 75%.

COMPARATIVE EXAMPLES 2-5

Urethane acrylates were obtained in the same manner in Comparative Example 1 by varying the kind of liquid rubber used in Comparative Example 1. The results are set forth in Table 1. The weight of a liquid rubber is 100 g.

Elongation 168%.

EXAMPLE 1

A solution of 29.2 g of "TDI" in 87.6 g (three times as much as "TDI" weight) of dioxane was introduced into a reactor of 500 ml and a solution of 7.5 g of 1,4-butanediol in 22.5 g (three times as much as 1,4-butanediol weiqht) of dioxane was added dropwise thereto through a dropping funnel while stirring under an atmosphere of nitrogen. During the dropwise addition, the reaction solution was maintained at a temperature of 45°-50° C. After completion of the dropwise addition, the solution was allowed to react at 45°-50° C. for 3 hours. Then, a solution of 10.8 g of "HEMA", 0.15 g of hydroquinone and 0.075 g of triethylenediamine in 33 g (three times as much as "HEMA" weight) of dioxane was added dropwise through a dropping funnel. During the dropwise addition, the reaction solution was maintained at 70°-80° C. After completion of the addition, the solution was allowed to react at 75°-80° C. for 2 hours. Further, a solution of 100 g of a liquid rubber "R-45D" in 300 g (three times as much as the liquid rubber weight) of dioxane was introduced into another reactor of 1,000 ml and the reaction product was added dropwise through a dropping funnel while stirring under an atmosphere of nitrogen. During the dropwise addition, the reaction solution was maintained at 75°-80° C. After completion of the dropwise addition, the solution was allowed to react at 75°-80° C. for 8 hours. The disappearance of a peak of isocyanate groups was confirmed by an infrared spectrum and the reaction was terminated.

5,400 ml (nine times as much as the reaction solution) of hexane in a beaker was stirred while the reaction solution was added slowly into the beaker to obtain a white precipitate. The precipitate, purified with the hexane, was allowed to dry for 2 days by a vacuum dryer. After this drying, solid-like urethane acrylate was obtained. This urethane acrylate was dissolved in tetrahydrofuran and Irgacure 651 of 5% as a sensitizer was added and dissolved therein to prepare a photosensitive liquid. This photosensitive liquid was applied on a glass plate and tetrahydrofuran was evaporated to dryness. The thickness after the drying was 100 μm and the film was exposed to an ultra-high voltage mercury lamp

TABLE 1

| Comparative example | Dienic liquid rubbers having hydroxyl groups | | | HEMA (g) | TDI (g) | Tensile strength (kg/cm²) | Elongation (%) |
|---|---|---|---|---|---|---|---|
| | Trade name | Average molecular weight | Content of hydroxyl groups (meq/g) | | | | |
| 2 | Poly bd R-45D[1] | 2,800 | 0.83 | 12.1 | 14.5 | 20 | 73 |
| 3 | Nisso-PBG-1000[2] | 1,350 | 1.18 | 15.4 | 20.6 | 16 | 50 |
| 4 | Nisso-PB-600[3] | 820 | 1.61 | 21.1 | 28.1 | unable to measure for the brittleness | |
| 5 | JSR-HTPB[4] | 2,120 | 0.93 | 12.0 | 16.0 | 12 | 11 |

[1] A product of Idemitsu Sekiyu Kagaku Inc., abbreviated as "R-45D".
[2] A product of Nippon Soda Inc., abreviated as "G-1000".
[3] A product of Nippon Soda Inc., abreviated as "G-600".
[4] A product of Nippon Gosei Gomu Inc., called as "JSR-HTPB".

COMPARATIVE EXAMPLE 6

Irgacure 651 of 5% as a sensitizer was added to commercially available urethane acrylate "Poly bd R-45 ACR: (a product of Idemitsu Sekiyu Kagaku Inc.) and a tension test piece was prepared in the same manner as in Comparative Example 1 and the tensile strength and the elongation were determined.

Tensile strength: 44 kg/cm² of 3 kw placed at a distance of 50 cm for 2 minutes, to obtain a cured film. The tensile strength and the elongation of the cured film were determined by a tension tester (the tension rate of 100 mm/min) to obtain a tensile strength of 132 kg/cm² and an elongation of 210%.

EXAMPLES 2-7

Urethane acrylate was obtained in the same manner as in Example 1 by varying the liquid rubber and dihydric alcohols having a molecular weight of less than 2,000 used in Example 1. The weight of a liquid rubber is 100 g.

TABLE 2

| Example | Dienic liquid rubber having hydroxyl groups | Dihydric alcohol having a molecular weight of less than 2,000 | | | HEMA (g) | TDI (g) | Tensile strength (kg/cm$^2$) | Elongation (%) |
|---|---|---|---|---|---|---|---|---|
| | | Kind | Mean molecular weight | Weight | | | | |
| 2 | JSR-HTPB | 1,2-propylene glycol | 76 | 7.0 | 12.0 | 32.3 | 126 | 187 |
| 3 | JSR-HTPB | triethylene glycol | 150 | 13.9 | 12.0 | 32.3 | 119 | 411 |
| 4 | JSR-HTPB | 1,4-butane diol | 90 | 12.0 | 8.5 | 32.3 | 165 | 318 |
| 5 | 2M-10 | 1,4-butane diol | 90 | 21.2 | 14.7 | 57.1 | 113 | 182 |
| 6 | Poly bd LM-15[5] | 1,4-butane diol | 90 | 14.0 | 12.0 | 37.5 | 157 | 330 |
| 7 | G-1000 | 1,4-butane diol | 90 | 15.8 | 10.9 | 42.4 | 128 | 311 |

[5]A product of Idemitsu Kagaku Inc., average molecular weight of 1,560, hydroxyl groups content of 1.08 meg/g Examples wherein the repeating unit number n of the above described hard segment is increased, are shown in the following Examples 8-10.

EXAMPLE 8

This example is the repeating unit number of n=2. A solution of 48.4 g of TDI in 145.2 g (three times as much as TDI weight) of dioxane was introduced into a reactor of 500 ml. A solution of 16.6 g of 1,4-butanediol, 0.02 g of hydroquinone and 0.02 g of triethylenediamine in 49.8 g (three times as much as 1,4-butanediol weight) of dioxane was added dropwise thereto through a dropping funnel while stirring under an atmosphere of nitrogen. During the dropwise addition, the reaction solution was maintained at 75°-80° C. and after the addition, the solution was allowed to react at 75°-80° C. for 2 hours. Then, a solution of 10.8 g of 2-hydroxyethyl methacrylate in 32.4 g of dioxane was added into the reactor and was allowed to react at 75°-80° C. by stirring under an atmosphere of nitrogen for 2 hours. Then, a solution of 100 g of liquid rubber JSR-HTPB in 300 g (three times as much as the liquid rubber weight) of dioxane was introduced into another reactor of 1,000 ml and the reaction solution was added dropwise thereto by a dropping funnel while stirring under an atmosphere of nitrogen. During the dropwise addition, the reaction solution was maintained at 75°-80° C. After completion of the addition, the solution was allowed to react at 75°-80° C. for 6 hours. The disappearance of a peak of isocyanate groups was confirmed by the infrared spectrophotometer and the reaction was terminated.

The solution was purified with hexane and dried in the same manner as described in Example 1 to prepare a test piece, the cured film was determined with the physical properties and the tensile strength was 165 kg/cm$^2$ and the elongation was 350%.

EXAMPLES 9 AND 10

Then, these examples are the repeating unit numbers of n=8 and 12 and the results are shown in Table 3. The weight of a liquid rubber is 100 g.

TABLE 3

| Example | Number of n | Dienic liquid rubber having hydroxyl groups | | HEMA (g) | TDI (g) | Tensile strength (kg/cm$^2$) | Elongation (%) |
|---|---|---|---|---|---|---|---|
| | | Kind | Weight (g) | | | | |
| 9 | 8 | 1,4-butanediol | 59.9 | 10.8 | 30.4 | 217 | 270 |
| 10 | 12 | 1,4-butanediol | 89.6 | 10.8 | 88.0 | 267 | 430 |

EXAMPLES 11-15

An addition polymerizable monomer was added to and dissolved in the urethane acrylates obtained in Examples 1, 2, 3 and 9 and Irgacure 651 of 5% of the total weight was added thereto to prepare photosensitive liquids. These photosensitive liquids were added dropwise on a glass plate and were spread to 100 μm in thickness with the use of an applicator and exposed in the same manner as in Example 1. The tensile strength and the elongation of the cured films were determined. The results are shown in Table 4. The weight of the urethane acrylate is 100 g.

TABLE 4

| Example | Blend of urethane acrylate | Added addition polymerizable monomer | | Tensile strength (kg/cm$^2$) | Elongation (%) |
|---|---|---|---|---|---|
| | | NVP[7] (g) | DEAMA[8] (g) | | |
| 11 | the same blend as Example 1 | 10 | 10 | 187 | 239 |
| 12 | the same blend as Example 1 | 50 | 50 | 150 | 278 |
| 13 | the same blend as Example 3 | 10 | 10 | 161 | 192 |
| 14 | the same blend as Example 4 | 10 | 10 | 114 | 421 |
| 15 | the same blend as Example 10 | 50 | 50 | 207 | 250 |

[7]N-vinyl-2-pyrolidone is abbreviated as "NVP".
[8]Diethylamino ethylmethacrylate is abbreviated as "DEAMA".

EXAMPLE 16

A relief was made using the photosensitizer blended in Example 12. The photosensitizer blended in Example 12 was applied on a polyethylene terephthalate film on which the surface was treated with a sand setting and the surface was covered with a silicon surface treated polyethylene terephthalate film to adjust the photosensitizing layer to be 200 μm thickness.

A negative film was adhered to the covered film and exposed to an ultra-high voltage mercury lamp of 3 KW placed at a distance of 30 cm from the film for 30 seconds. After the exposure, when the cover film was stripped off and a mixed solution of dioxane and ethanol (the mixed ratio was 1:2) was sprayed thereon, a nonexposed part began to dissolve easily and a relief wherein a contour of the negative film was reproduced, was obtained without swelling the exposed part.

Table 1 clearly shows the low physical property values of the synthesized reaction group of comparative Examples 3-6 having no dihydric alcohol present.

In Examples 1-15, the ethylenically unsaturated monomer has a small contribution to the physical property value. A good resul is obtained when ethylenically unsaturated monomer is present in amounts of 2-25 parts per 100 parts of dienic liquid rubber. When dihydric alcohol is present in amounts of less than 1 part per 100 parts dienic liquid rubber and diisocyanate compound is present in amounts of less than 5 parts per 100 parts of dienic liquid rubber, the physical property values of the resultant rubber-product are low. Similarly, when dihydric alcohol is present in amounts of more than 90 parts per 100 parts dienic liquid rubber and diisocyanate compound is present in amounts of more than 190 parts per 100 parts dienic liquid rubber, the resultant rubber-product loses its elasticity and becomes hard. This departs from the object of the present invention.

As mentioned above, the rubber of this invention is a photopolymerizable rubber comprising a dienic liquid rubber having hydroxyl groups, an ethylenically unsaturated monomer having hydroxyl groups, a dihydric alcohol having a molecular weight of less than 2,000, preferably less than 300, and diisocyanate compounds, said rubber having a structure consisting of hard segments having a urethane bond composed of a dihydric alcohol having a molecular weight of less than 2,000, preferably less than 300, and a diisocyanate compound, soft segments composed of a rubber molecular chain and photo-crosslinked points owing to the ethylenically unsaturated monomer having hydroxyl groups which bond to the hard segments. Further, the photocured product shows the properties of a rubber-like cured product of a high tensile strength and a high elongation, and can be used for a high elastic ink, a high elastic paint, a flexoplate, etc.

What is claimed is:

1. A photopolymerizable rubber having the structural formula:

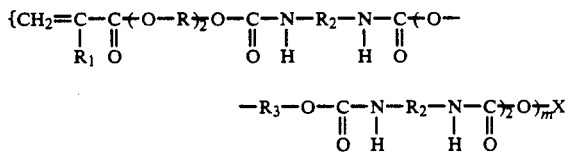

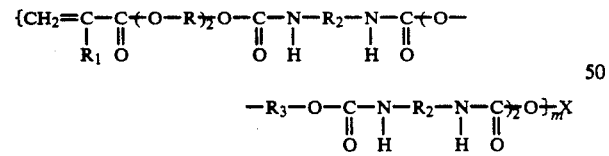

wherein

R is an alkylene group having 2-8 carbon atoms, $R_1$ is hydrogen or $CH_3$, $R_2$ is a diisocyanate residue from a diisocyanate selected from the group consisting of tolylene diisocyanate, xylene diisocyanate, naphthalene diisocyanate, hexamethylene diisocyanate, isophorone diisocyanate, 4,4'-diphenylmethane diisocyanate, lysine diisocyanate, and hydrogenated tolylene diisocyanate, $R_3$ is a residue of a dihydric alcohol excluding hydroxyl groups selected from the group consistinig of ethylene glycol, diethylene glycol, triethylene glycol, a propylene glycol, a butane diol, a pentane diol, a hexane diol, and trimethylol propanemono(-meth)acrylate, X is a residue excluding hydroxyl groups of an hydroxyl-containing dienic liquid rubber having m hydroxyl groups, l is about 1-4, m is the valence number of hydroxyl groups of the hydroxyl-containing dienic liquid rubber and $1 < m < 4$, and n is from 1 to 16.

2. The photopolymerizable rubber of claim 1 wherein $R_3$ is a residue of a dihydric alcohol selected from the group consisting of ethylene glycol, diethylene glycol, triethylene glycol, 1,2-propylene glycol, 1,3-propylene glycol, 1,3-butanediol, 1,4-butanediol, 1,5-pentanediol, 1,6-hexanediol, trimethylol propane monoacrylate, and trimethylolpropane monomethacrylate.

3. The photopolymerizable rubber of claim 1 wherein X is a residue of a hydroxyl-containing dienic liquid rubber having a number-average molecular weight of about 1,000 to about 10,000 and selected from the group consisting of 1,2-polybutadiene, 1,4-polybutadiene, 1,2-polypentadiene, styrene-butadiene copolymer, and acrylonitrile-butadiene copolymer, all of which contain hydroxyl groups.

4. A photopolymerizable rubber composition comprising a photopolymerizable rubber having the structural formula:

wherein

R is an alkylene group having 2-8 carbon atoms, $R_1$ is hydrogen or $CH_3$, $R_2$ is a diisocyanate residue from a diisocyanate selected from the group consisting of tolylene diisocyanate, xylene diisocyanate, naphthalene diisocyanate, hexamethylene diisocyanate, isophorone diisocyanate, 4,4'-diphenylmethane diisocyanate, lysine diisocyanate, and hydrogenated tolylene diisocyanate, $R_3$ is a residue of a dihydric alcohol excluding hydroxyl groups selected from the group consisting of ethylene glycol, diethylene glycol, triethylene glycol, a propylene glycol, a butane diol, a pentane diol, a hexane diol, and trimethylol propanemono(-meth)acrylate, X is a residue excluding hydroxyl groups of an hydroxyl-containing dienic liquid rubber having m hydroxyl groups, l is about 1-4, m is the valence number of hydroxyl groups of the hydroxyl-containing dienic liquid rubber and $1 < m < 4$, and n is from 1 to 16, and at least one compound selected from the group consisting of an addition-polymerizable ethylenically unsaturated monomer present in an amount of 10-300 parts by weight per 100 parts by weight of dienic liquid ruber, a photosensitizer present in an amount of 1-10 parts by weight per 100 parts by weight of dienic liquid rubber, and a thermopolymerization inhibitor present in an amount of 0.05–1 parts by weight per 100 parts by weight of dienic liquid rubber.

5. The photopolymerizable rubber composition of claim 4 wherein said addition-polymerizable ethylenically unsaturated monomer is selected from the group consisting of 2-hydroxyethyl acrylate, 2-hydroxyethyl methacrylate, 2-hydroxypropyl acrylate, 2-hydroxypropyl methacrylate, polypropylene glycol monomethacrylate, methyl methacrylate, ethyl methacrylate, butyl methacrylate, glycidyl methacrylate, 1,4-butylene dimethacrylate, ethyleneglycol dimethacrylate, diethylaminoethyl methacrylate, methyl acrylate, ethyl acrylate, butyl acrylate, lauryl acrylate, trimethylolpropane diacrylate, trimethylolpropane triacrylate, neopentyl glycol diacrylate, 1,6-hexanediol diacrylate, diethylaminoethyl acrylate, methacrylic acid, acrylic acid, acrylonitrile, acrylamide, N-methylol acrylamide, styrene, vinyl toluene, divinyl benzene, α-methyl styrene, vinyl acetate, N-vinyl-2-pyrrolidone, and diallyl phthalate.

6. The photopolymerizable rubber composition of claim 4 wherein said photosensitizer is selected from the group consisting of benzoin, benzoin methyl ether, benzoin isopropyl ether, benzoin butyl ether, benzophenone, Michler's ketone, 1-naphthalene sulfonyl chloride, 2,5-naphthalene disulfonylchloride, 2-naphthalene sulfonyl chloride, azoisobutyronitrile, 1-azobis-1-cyclohexanecarbonitrile, benzil dimethyl ketal, 2-methylanthraquinone, biimidazole, thioxanthone, 2,4-diisopropylthioxanthone, 2,2-diethoxyacetophenone, benzoin peroxide, and 2,4-dichlorobenzoyl peroxide.

7. The photopolymerizable rubber composition of claim 4 wherein said thermopolymerization inhibitor is selected from the group consisting of hydroquinone, t-butyl catechol, o-dinitrobenzene, o-nitrophenol, m-nitrophenol, p-nitrophenol, 2,4-dinitrophenol, 2,4,6-trinitrophenol, and ferric chloride.

* * * * *